United States Patent [19]

Vannan, Jr.

[11] 4,231,410
[45] Nov. 4, 1980

[54] PRE-SHAPED PLASTIC REINFORCING MEMBER AND A TIRE ENCAPSULATING SAID MEMBER

[75] Inventor: Frederick F. Vannan, Jr., Akron, Ohio

[73] Assignee: The Goodyear Tire & Rubber Company, Akron, Ohio

[21] Appl. No.: 653,166

[22] Filed: Jan. 28, 1976

Related U.S. Application Data

[60] Division of Ser. No. 400,083, Sep. 24, 1973, abandoned, which is a continuation-in-part of Ser. No. 250,702, May 5, 1972, Pat. No. 3,891,740.

[51] Int. Cl.³ .................... B60C 5/12; B60C 9/14
[52] U.S. Cl. .................... 152/356 R; 152/375; 152/DIG. 10; 428/295
[58] Field of Search .......... 152/354 R, 357 R, 357 A, 152/356 R, 359, 302, 157, DIG. 10, 375; 428/294, 295; 264/326, 328; 156/125

[56] References Cited

U.S. PATENT DOCUMENTS

| | | | |
|---|---|---|---|
| 2,757,701 | 8/1956 | Henson | 264/326 X |
| 2,902,072 | 9/1959 | Reuter | 152/357 A |
| 3,397,728 | 8/1968 | McCrary et al. | 152/308 X |
| 3,458,373 | 7/1969 | Knipp et al. | 156/125 |
| 3,794,093 | 2/1974 | Boscaino | 152/302 X |
| 3,807,474 | 4/1974 | Wendt et al. | 301/63 PW |

*Primary Examiner*—F. J. Bartuska
*Attorney, Agent, or Firm*—J. D. Wolfe

[57] ABSTRACT

A method of forming a ply by injection molding a fluid material such as polyester or polyamide and congealing to form a ply or plies, placing said plies in a mold and injecting in a fluid precursor material which when cured yields a tire having ply reinforcement. The injection molded plies and/or the preshaped member are then used to mold a reinforced tire.

7 Claims, 19 Drawing Figures

PRE-SHAPED PLASTIC REINFORCING MEMBER AND A TIRE ENCAPSULATING SAID MEMBER

This application is a division of application Ser. No. 400,083, Sept. 24, 1973, now abandoned, which is a continuation-in-part of application Ser. No. 250,702, filed May 5, 1972, which is now U.S. Pat. No. 3,891,740, issued June 24, 1975.

This invention relates to a method of making a plastic or a filament or strand reinforced tire and to said tire. More particularly, this invention relates to a method of making a reinforcing member or preshaped member of a tire having a single or multiple ply construction, to said construction, to said component and tire, as well as construction of an elastomeric matrix to support the reinforcing component.

It has been the desire ideally of the tire designer and builder to build a tire using essentially the fabric and rubber precursors to thereby eliminate the steps of spinning and shaping the fabric and/or compounding and extruding, and cutting the rubber as well as the elimination of the conventional tire building steps.

Therefore, an object of this invention is to present a method of building a fabric reinforced tire that permits this ideal to be more nearly approximated.

The nature of this invention can be more readily understood by reference to the drawings wherein.

Figure 1:
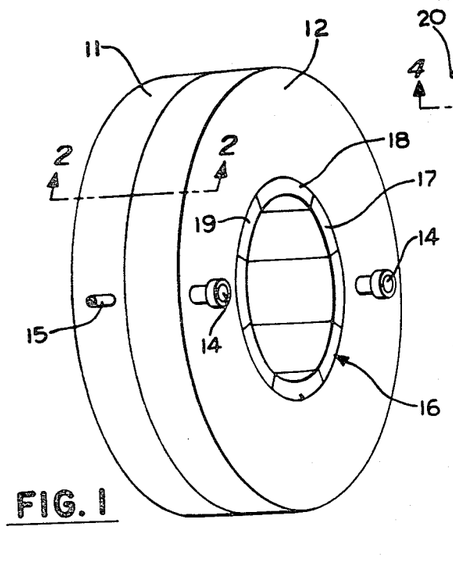
FIG. 1 is a perspective view in elevation of a mold for molding the fabric or filament composition to form or shape a ply of a reinforced tire.

Referring specifically to FIG. 1, numeral 11 identifies the bottom half of a ply mold and numeral 12 identifies the top half of said ply mold. The top and bottom halves are shown in FIG. 1 in mated relationship with ports 14 positioned for injecting in the material to form the molded fabric reinforcing member and an exhaust or vacuum port 15 is shown positioned on the outside circumference of the mold to facilitate removing air and obtaining the desired inert gas blanket or vacuum within the mold. It should be appreciated that the inlet and outlet ports 14 and 15 respectively will be placed around the mold as needed to facilitate filling the mold. Also, in FIG. 1 is shown a collapsible core 16 having segments 17, 18 and 19, etc. which permits the mold easily and quickly to be opened and the fabric ply to be removed. Balloon filling of the mold and top venting reduces the tendency for bubble formation.

Figure 2:
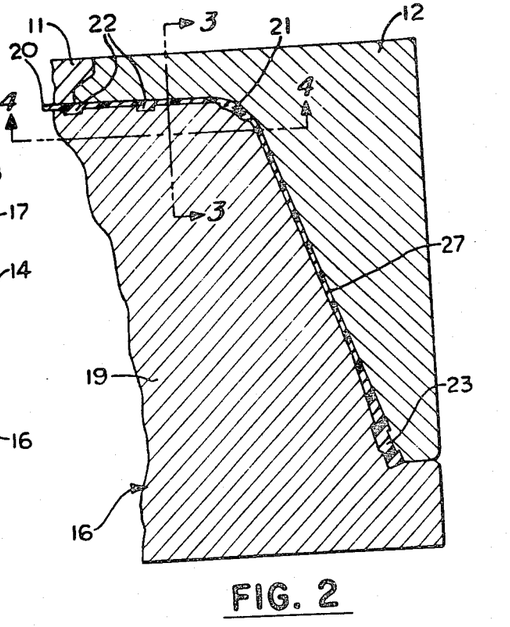
FIG. 2 is a partial cross-sectional view of the mold of FIG. 1 along line 2—2 showing the fabric or filament component or ply in the cord path direction.

The nature of the new ply more readily may be understood by reference to FIG. 2 where the molded cord or fabric 20 is shown having bands 21 and 22 for holding the individual parts, viz. filaments in the desired relationship as the plies are removed from the ply mold and placed in the mold for forming a tire. The tie bands 21 and 22 also form another useful function as they all tend to give the plies the desired spacing within the tire mold and thus will reduce the amount of friction between one ply and another ply.

Figure 3:
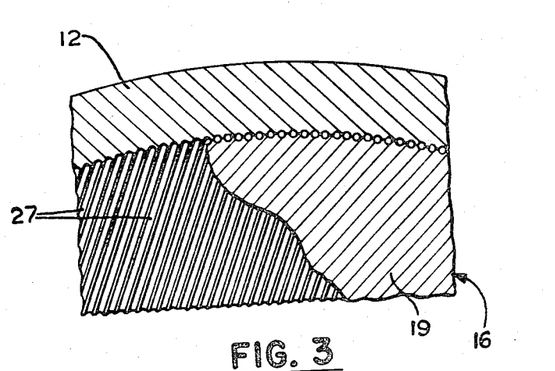
FIG. 3 is a partial cross-sectional view along line 3—3 showing the detail of the grooves for forming the cords in the crown of the mold.
Figure 4:
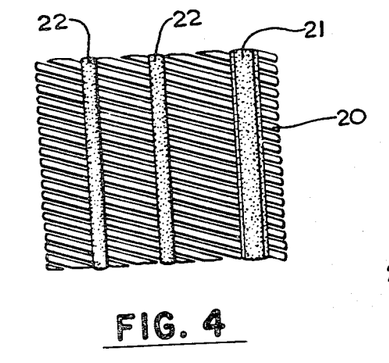
FIG. 4 is a plan view of a fabric ply showing the detail of the fabric and means for molding filament in a unitary body.
Figure 5:
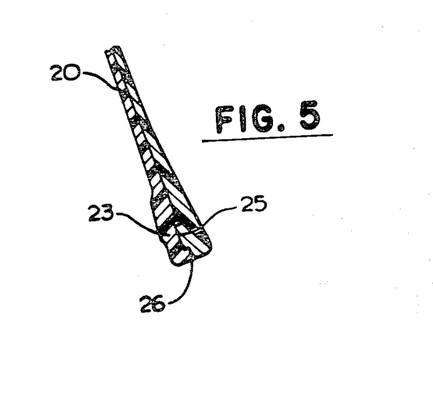
FIG. 5 is a partial view of two fabric plies with the bead of one positioned and resting in a mated relationship inside the recess of the bead section of the other ply.

It should be noted that the individual cords in the ply terminate in the bead section 23 and that in the first ply the bead section is notched to receive the ridge molded into the bead section of the second ply which may be more readily seen and appreciated in FIG. 5 where the ridged bead of the second ply 25 rests within the notched bead of the first ply to thereby allow the two plies to rest in a unitary relationship to form the unitary bead section 26. Thus, by this means of construction it is possible to form the cord plies per se by injecting the cord forming material into the inlet ports 14 to fill the grooves 27 more clearly shown in FIG. 3. When the grooves 27 of the mold have been filled and the filament-forming material set, the fabric may be removed from the mold by opening the mold to give a ply having the details more clearly shown in FIG. 4.

It should be readily apparent that it is possible to form plies with a cord path having either a right-hand or left-hand relationship where the first ply is formed in a mold having a cord path that gives a cord having a left-hand bias or left-angle configuration and the second ply is formed in a mold having a right angle or bias configuration.

Figures 11, 12, 13, 15, 16, 17, 19:
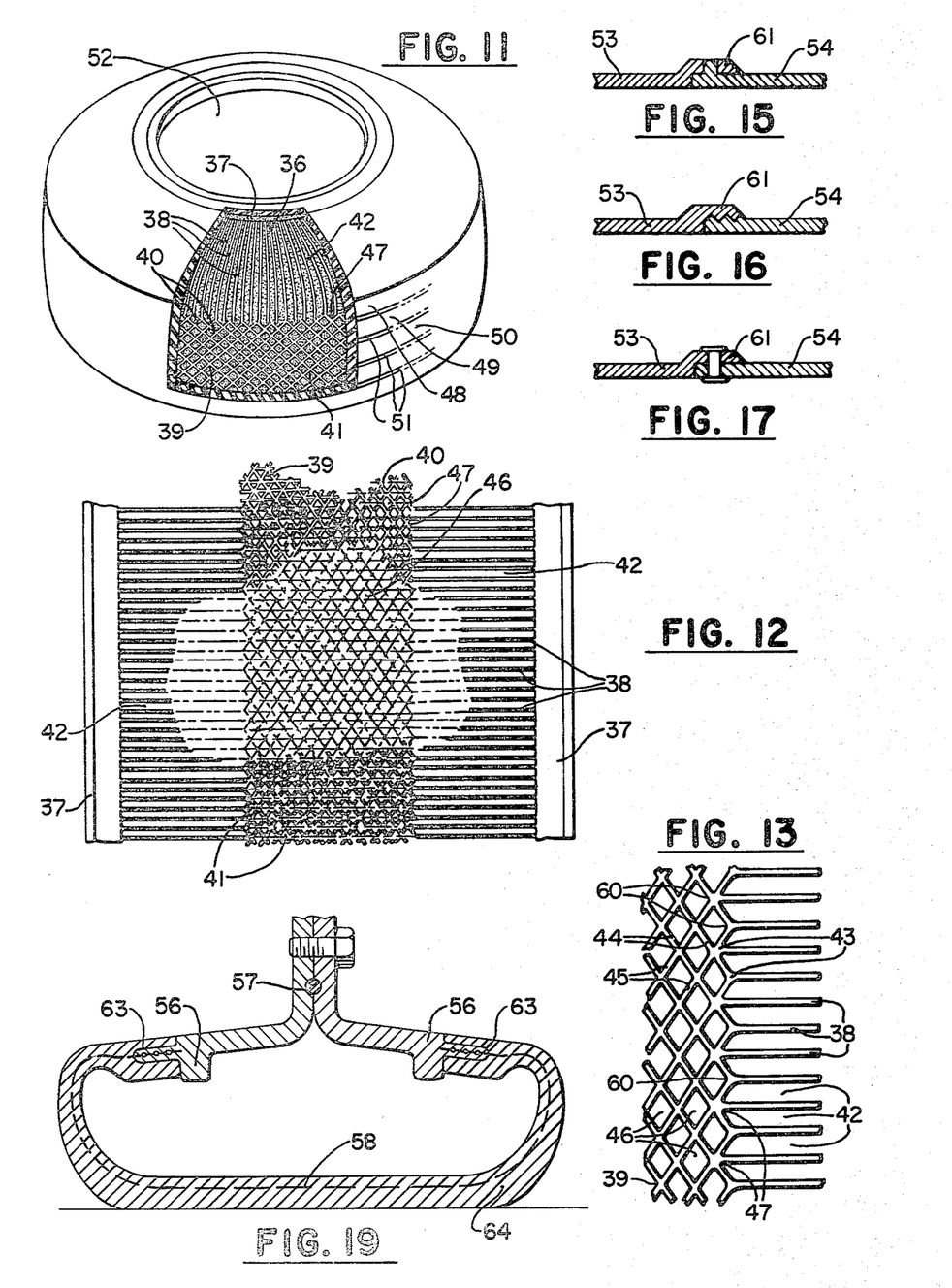
FIG. 11 is a perspective view in partial section of a tire having the preshaped unitary reinforcing member positioned in the tire.
FIG. 12 is a plan view of the reinforcing strands in the preshaped reinforcing member for a tire.
FIG. 13 is a partial enlarged view of FIG. 12.
FIGS. 15, 16 and 17 show various methods of mechanically fastening or locking the plies or also the ends of the split-type preshaped reinforcing members together.
FIG. 19 shows another embodiment of tire-rim assembly where the tire has the contour of some of the more recent tire designs.
Figures 14, 18:
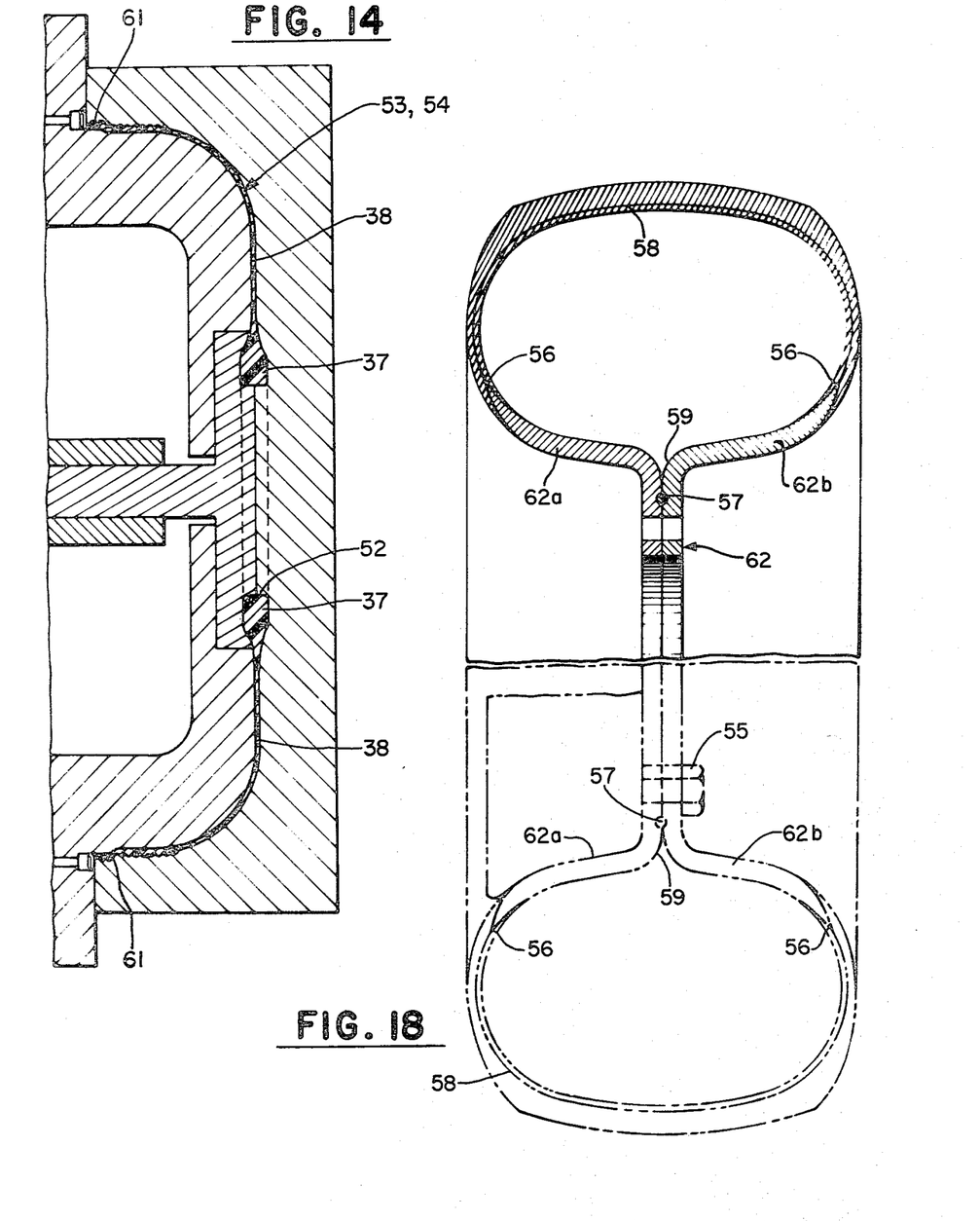
FIG. 14 is a cross-section through a mold for forming a split type preshaped reinforcing member.
FIG. 18 shows a cross-section through a tire-wheel assembly where the preshaped reinforcing member in the bead area is joined integrally with the tire rim to achieve a unique tire-wheel assembly.

This invention is readily amenable to use of any cord path, as well as use of reinforcing breakers and use of any bead shape or combination of materials whereby the tire design can be molded precisely as desired by the designer, for example, as shown in FIGS. 12, 13 and 14.

Figure 7:
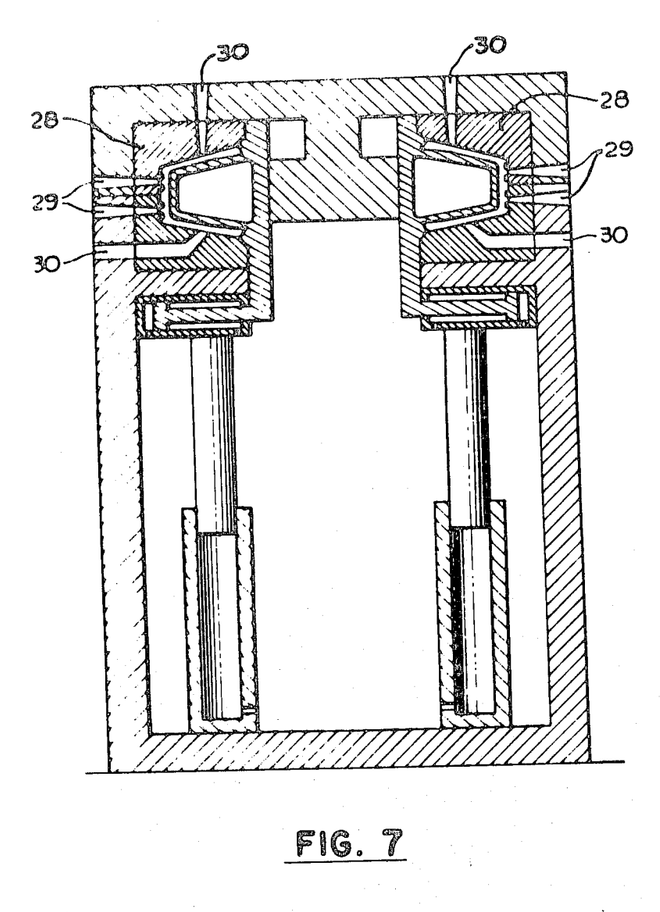
FIG. 7 is a cross-section through a curing press in closed position.
Figure 8:
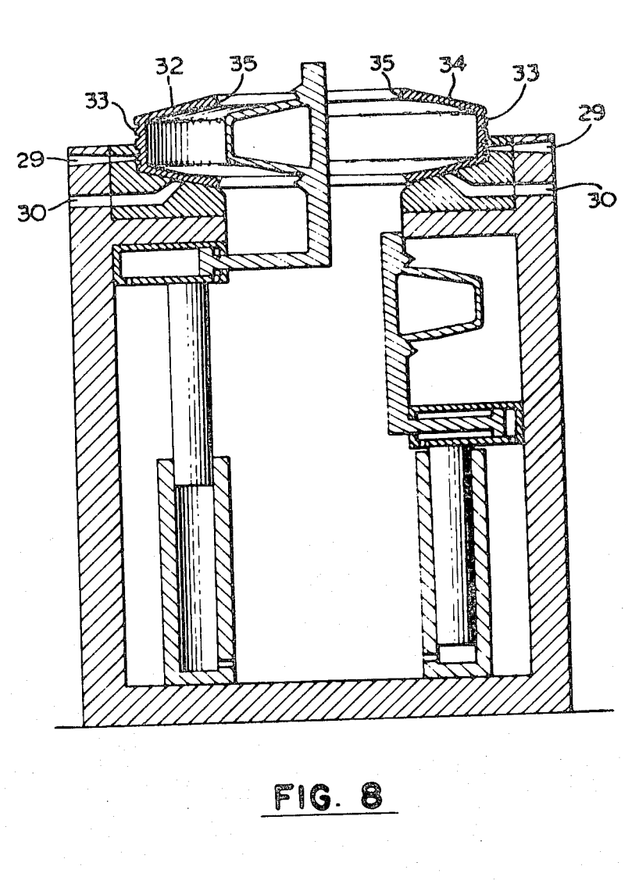
FIG. 8 is a cross-section through a curing press in the open position showing the cured tire ready to be stripped from the mold.

When the desired number of plies have been formed, then the plies are placed in the mold and the tie bands 21 and 22 hold the plies away from the mold and in the desired spaced relationship. The plies in the mold can be formed into a tire by suitable injection of elastomeric material to give a tire having the cross section more readily shown in FIG. 6. The tire mold used in forming the tire using plies formed in the manner described in accordance with this injection method may be more readily understood by reference to FIG. 7 which shows the closed mold having the plies placed in position and ready to receive a suitable injection of rubber material to form the sidewall and tread section as it would be familiar to those of ordinary skill in the art. Reference to FIG. 8 shows the mold in the open position ready to permit the molded tire to be removed from the mold to give a tire having the cross section shown in FIG. 6.

The material used to form the cords or plies of this invention are broadly of the thermoplastic thermosetting type which may be melted and injected into the ply mold through the ports 14 and then be set or solidified to give a ply that can be removed, and the material has become thermosetting in nature after the molding. The preferred materials for forming the plies of this invention are the polyamide resins and the polyester resins. In the polyamide resins it is specifically desirable to utilize liquid lactams containing the desired catalysts and promoters which may be injected in the ply mold or unitary preshaped reinforcing member and then be polymerized and set to give a finished nylon fabric ply or preshaped reinforcing member. The nature of this art is readily understood and more particularly described in the patent art by U.S. Pat. Nos. 3,448,085 and 3,017,391. Also, specifically preferred is the higher melting polyamides such as those available under the name "Kapton" from E. I. duPont deNemours & Company, as well as the polyimide type resins or Milar type polyesters.

Representative of the many polyesters that are used for tire cords is the terephthalates of ethylene glycol and copolymers of terephthalic acid with phthalic and isophthalic acid. These materials having suitable intrinsic viscosity may be melted and injected into the cord mold to form the tire ply. It is also desirable that the various well-known techniques such as intrinsic viscosity jumpers be used to further enhance the viscosity to give a polyester that is less readily melted and having improved heat characteristics. Thus, it is preferred the polyesters or polyamides, for instance, become thermosetting in nature after the molding operation.

Once the tire ply has been formed and placed in the mold the ply may be covered with an elastomeric material such as the liquid polyurethane reaction mixture or those so-called encapsulated rubber dispersions in a suitable extender oil which when injected into the tire mold and heated to the cured temperature, cures to give essentially a homogeneous elastomer. The nature of these elastomeric materials and their preparation are well known and illustrated in the following recent patents: Canadian Pat. No. 860,084 and French Pat. No. 1,526,075.

EXAMPLE I

A ply mold of the type shown in FIG. 1 and related drawings is connected to a pressurized extruder by ports 14 and a vacuum of 5 p.s.i. (pounds per square inch) pulled on ports 15. The extruder is charged with a molding grade polyamide Kapton, a trademark of E. I. duPont deNemours & Company, and worked as the temperature of the extruder was sufficient to permit the Kapton as a semi fluid-to-fluid mixture to be forced into the cavity of the ply mold to fill the grooves thereof. The mold is cooled below melting point of the polyamide to solidify the polyamide in the cavity so the ply could be removed when the mold is open.

A second ply is molded in like manner. Preferably the first ply is molded in a mold to give the filament a left-hand bias and the second ply is molded in a mold to give its filaments a right-hand bias. The plies are then placed in the mold to cause the bead of the second ply to nest in the bead of the first ply in the manner shown in FIG. 5. With the plies positioned in the mold, the mold is closed and an elastomeric tire extruded around the plies by injecting suitable fluid elastomer or elastomeric precursor into the mold to fill it.

Satisfactory fluid elastomers for this purpose are those shown in Examples A and B as well as the other examples of French Pat. No. 1,526,075.

The following examples are given by way of illustration but not limitation of the many elastomers and elastomer precursors known and useful in this invention, and all parts are expressed in weight, except for contrary indication.

EXAMPLE A

This example illustrates the method of applying a surface film to rubber particles mixed by spray drying, and the formulation of a fluid mixture with two phases by dispersing the spray dried particles in a dispersion liquid.

A solution in hexane of a polybutadiene containing about 15 percent polybutadiene is mixed in solution by mixing, with agitation, with the following mixture ingredients:

| Polybutadiene | 100 |
|---|---|
| Carbon black* | 68 |
| Zinc oxide | 2 |
| Stearic acid | 2 |
| Antioxidant | 1.5 |
| Sulfur | 2 |
| Accelerator | 1.5 |
| Total | 177 |

*Furnace black of highly abrasive intermediate grade.

The fluid mixture is adjusted to a total content of solids of 20 percent by evaporating excess hexane which may have been added as a vehicle for some pigments.

A certain amount of the above mixed rubber mastic is emulsified in an aqueous 10 percent solution of polyvinyl alcohol (Elvanol 50–42 which is a trademark of E. I. duPont deNemours & Company and which is composed essentially of polyvinyl alcohol and esterified derivatives), by using a sufficient amount of this latter to provide one part of polyvinyl alcohol per 3 parts of compounded rubber (that is, polybutadiene plus pigments). An Eppenbach homogenizer or equivalent high shearing assembly to carry out the emulsification of the compounded rubber mastic and to produce small particles having a diameter essentially between 1 and 30 microns. The polyvinyl alcohol serves as colloidal stabilizer for the system of particles, and subsequently as barrier around the spray-dried particles. The hexane is evaporated from the system with stirring, in order to leave a system of compounded rubber particles. A certain amount of water is removed with the hexane, but is replaced to provide a total final content of solids of 20 to 25 percent.

The aqueous dispersion, free from hexane, of the compounded rubber, is spray dried to obtain fine particles of compounded rubber coated with polyvinyl alcohol, the ratio of the weight of the rubber to the coating being 75:25. The particles obtained in this manner are mixed with a rubber diluting oil of the paraffinic type in the proportions of about 60 parts of oil per 100 parts of particles in order to form a fluid rubber paste. The mixture remains fluid at ambient temperature so it can be made to flow into a mold cavity, where it can be subjected to a temperature of 143° C. in a hydraulic press for 60 minutes. The initially fluid rubber composite is transformed into a solid and firm vulcanizate.

The product of Example A can be varied to obtain a range of values of the ratio of the polyvinyl alcohol to the rubber, by varying the resistance of the encapsulated particles to the oils and to the plasticizers used as liquid component of the rubber composition in two phases. For example, the thickness of the coating may be reduced so that the ratio of the rubber to the coating is 97:3. The storage time of the fluid rubber composition thus varies within a wide time range.

The product may also be varied in regard to the polymeric film-forming material used to apply a coating to the particles. The materials soluble in water or capable of being dispersed in water that may be used are gelatin, gum arabic, or copolymer of styrene and maleic anhydride (for example, Lytron), copolymers of methyl and vinyl ether and maleic anhydride (for example, Gantrez, a trademark of General Aniline & Film Corporation), methyl cellulose, hydroxyethyl cellulose, polyvinyl pyrrolidone, a dextrin, a carboxylated dextrin, block copolymers containing hydrocarbon polymer blocks and polyether blocks such as polyethylene oxide, block copolymers of different alkylene oxides, polymers and copolymers of acrylic acid and numerous other materials.

The formula for vulcanizing the rubber may be varied at will to give those properties well known to the rubber compounder.

The product may again be modified in regard to the nature and the amount of liquid dispersion agent in which the encapsulated particles (surrounded by a barrier layer) are put in suspension. The liquid dispersion agent may be used in amounts between 25 and 150 parts per 100 parts of particles. The liquid dispersion agent may be any of the classic rubber diluting oils or mixtures of these, with or without supplementary amounts of other liquids to increase or decrease the viscosity or adjust the characteristics of the fluid rubber in another manner.

Plasticizers of the ester type (mono- and poly-esters), polyglycols, ethers and formals may be used. It is usually desirable to adapt the liquid dispersion agent to the materials of the surface film of the particles, or conversely, so as to obtain a satisfactory resistance time of the particles to the diffusion to their interior of the liquid dispersion agent.

EXAMPLE B

A solution in hexane of a polybutadiene containing about 15 percent polybutadiene is mixed in solution by mixing it, with stirring, with the same compounding ingredients as those used in Example I or with other suitable vulcanization ingredients. The liquid mixture is adjusted to a total solids content of 20 percent by evaporating the excess hexane which is added as the vehicle for some pigments.

A certain amount of the above mixed rubber mastic is emulsified in an aqueous solution with 10 percent of a gelatin (super-clarified "Atlantic" gelatin of the A, low Bloom type) by using a sufficient amount of this latter solution to provide one part of gelatin per 2 parts of compound rubber (that is, polybutadiene plus pigments). An Eppenbach homogenizer is used to emulsify the liquid mastic. The gelatin serves initially as stabilizer for the colloidal system, and later as barrier around the rubber particles.

The hexane is evaporated from the system by agitating, for example, in a disk, concentrating apparatus of the type used to increase the total solids content of the latex. A part of the water is removed with the hexane, but it is continuously or intermittently replaced to maintain the total solids content between 20 and 25 percent (compounded rubber plus gelatin).

The micro-encapsulation of the rubber particles is carried out in the following manner: the hexane-free dispersion of compounded rubber particles in solution in gelatin which is obtained is taken to 50° C. and subjected to a separation of the gelatin on the rubber particles, the coacervation being effected by slow addition of 460 cm$^3$ approximately of an aqueous solution with 20 percent sodium sulfate to about 1150 grams of this dispersion of rubber particles in solution in gelatin at 50° C. by stirring continuously. The gelatin is hardened around the rubber particles at a lower temperature by pouring the mixture with stirring into 2.08 liters of a 7 percent solution of sodium sulfate between 0° and 10° C. and by maintaining the temperature at this level. The encapsulated particles are washed by allowing them to settle in the aqueous system maintained between 0° and 10° C., by decanting the supernatant aqueous phase, by adding a supplemental amount of cold water (0°-10° C.) and by dispersing the particles. This series of operations may be repeated several times. The final dispersion of rubber particles coated with gelatin may be dried by spray drying to isolate them. Also, they may be treated with formaldehyde to harden the capsule surrounding each particle, on which the particles may be recovered by filtration or by spray drying. Any previously mentioned process of coacervation may be adopted to deposit a film around rubber particles, and any process for recovery of the particles coated with a film by coacervation may be used in place of that described more particularly in this example.

The dried encapsulated rubber particles are mixed with a plasticizer such as a rubber diluting oil to form a fluid mixture, which may be used in tire molding operations and then be followed by a heating to form vulcanized rubber products.

Figures 6, 9, 10:
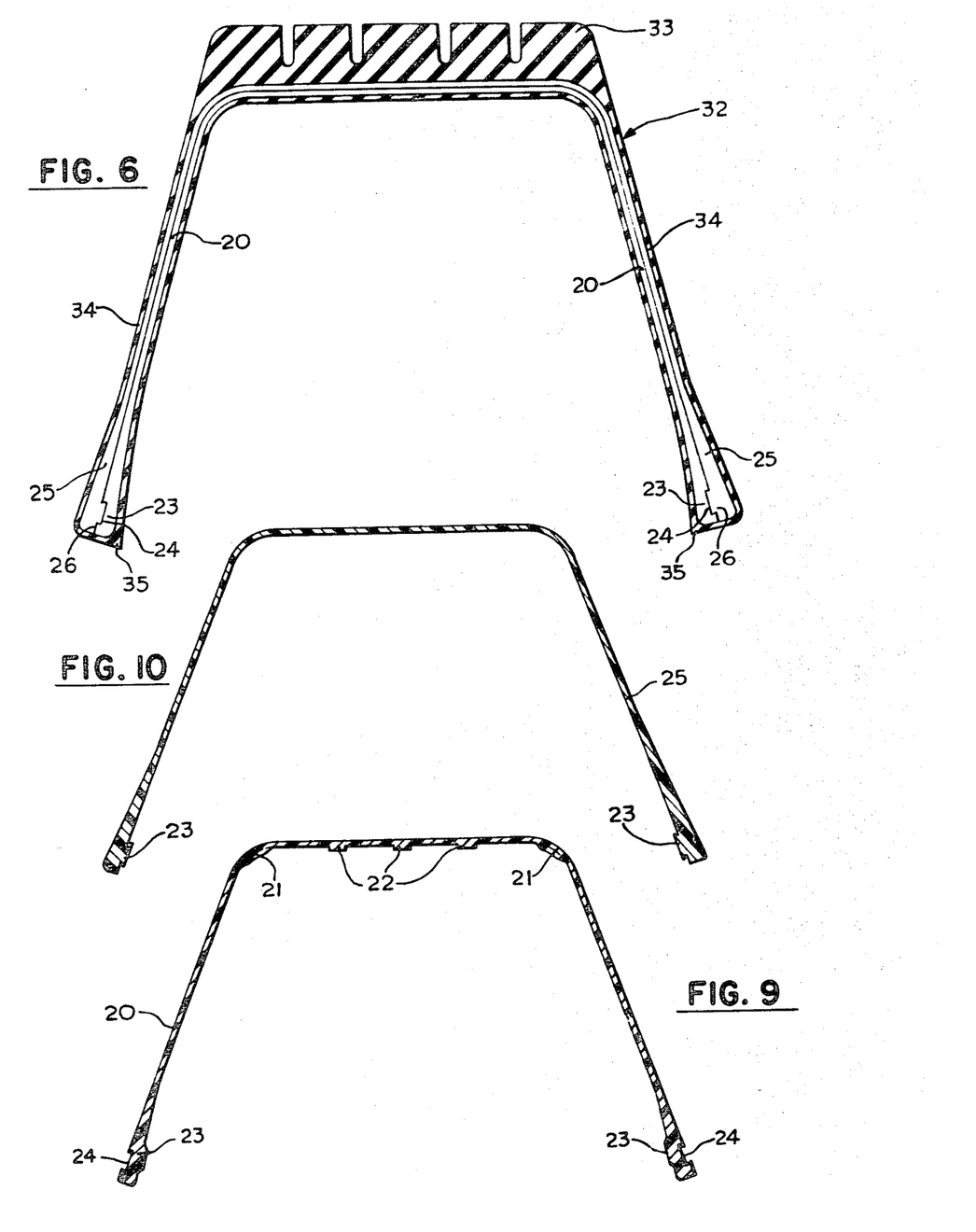
FIG. 6 is a cross-sectional view through the finished tire.
FIG. 9 is an enlarged cross-sectional view along the cord path of one embodiment of the first ply.
FIG. 10 is an enlarged cross-sectional view along the cord path of one embodiment of the second ply.

In another embodiment, the fluid elastomeric precursors are chosen and compounded preferably to be those well known to the rubber compounder as tread stocks and carcass stocks. Then the fluid tread stock is injected into mold 28 through tread injection ports 29 and the fluid carcass stock is injected into the mold through carcass injection ports 30. The cured tire, which has been heated to curing temperature 250°-350° F. is then removed from the open press mold 31 of FIG. 8 to give a finished tire 32. Reference to FIG. 6 shows the tread 33, preferably of a specially compounded tread stock of high cis polybutadiene and a carcass rubber 34 enveloping the plies and terminating in a bead foot 35.

Referring specifically to FIGS. 11 and 12, another embodiment of the invention is shown where the numeral 36 indicates a unitary preshaped reinforcing member. This unitary preshaped reinforcing member has a bead area 37 having a series of continuous radial strands 38 extending upward therefrom to the tread area 39. As the strands enter the tread area, they may have a criss-cross appearance to form a criss-crossed pattern 40 in the tread area. In FIGS. 11 and 12 this pattern is shown as essentially trapezoidal or more precisely as a rectangular or diamond pattern 41 of equal sides. This criss-cross pattern with the radial strands form essentially a belt design in the tread area and thus in one aspect, the tire could be said to have a belt design in the tread area. It should be appreciated that any network of fabric reinforcing can be obtained by this invention. For example, by controlling the angle of branching of the strands a rectangular or square pattern can be obtained in the tread to give a belt-type reinforcing member. Especially is this so where the cross-sectional dimension of each strand is varied to give a high degree of strength in one direction or flexibility in all directions or in a single direction. For instance, the strands running axially around the circumference of the tire could be varied to give a thickness several times that of the width, or vice versa, to achieve the desired strength and flexibility in the desired direction. This is a feature not readily, if at all, obtainable in the conventional woven fabric networks. Also, the strands can be varied from trapezoidal in cross-section to essentially circular to elliptical to give the desired degree of strength and flexibility in plane and direction desired as the tire is operated.

In FIG. 13 a preferred method of changing the chord pattern is shown in greater detail with the chords 38 running in a radial manner from the tire bead 37 through the sidewall area 42 and then changing into a two or more ply bias angle chord pattern. This is achieved by having the individual strands 38 at the juncture 43 changing into a wishbone shape or design to give the bias strands 44 and 45 specifically in the tread area. As the bias strands cross each other they can form various patterns as shown by numeral 46, where the pattern is diamond shape. Use of the wishbone strand effect permits the degree of flexibility and stiffness at the junction line 47 of the sidewall and tread to be controlled to thereby control the tread reinforcing thickness and tread wear in the first 48, second 49, third 50, etc. tread ridges formed by grooves 51. Also, the degree of curvature 60 in the junction 43 can effect the tear and flex life of the tire. Therefore, it is preferred that sharp angles be avoided. It should be readily apparent that this mode of forming the preshaped reinforcing member provides a method for obtaining a tire where internal reinforcing can be bias, bias belted, radial belted or radial in the carcass area and bias in the tread area, to thereby permit properties to be optimized in the tire from the bead to the tread of the tire. In effect, any chord pattern can be achieved even to a network where strands essentially become sheets with a network of holes which are essentially circular, depending on radius of curvature at the junction lines 47.

Since the above described preshaped reinforcing member is cast or molded as a single piece, the mold will need to be of the sectional type, which can be removed through the torus circle 52. Therefore, in some instances, it would be preferred to mold or cast the preshaped reinforcing member in two halves 53 and 54 respectively, as illustrated in FIG. 14. Then these two halves can be fastened together in their end areas 61 by suitable methods such as the mechanical fasteners shown in FIGS. 15, 16 and 17 to give a unitary preshaped reinforcing member. Alternately, the ends 61 could be fused together or cemented together to give the desired unitary design. Then the unit can be placed in the mold and be encapsulated in elastomer to give a finished tire. Also, FIGS. 14, 15 and 16 share some of the many arrangements. The ends 61 can be molded and yet be joined to give a unitary preshaped reinforcing member having the torus-configuration of a tire.

This invention in one of its embodiments is especially well adapted for making tires for use with run-flat devices. This aspect of the invention is best illustrated by reference to FIGS. 18 and 19 where the numeral 62 identifies a two-piece wheel assembly. The two-piece wheel assembly preferably comprises two wheel halves 62a and 62b respectively, shown in this embodiment bolted together in this assembly with the wheel by bolts 55. The rim portions 62a and 62b can be bolted onto the vehicle axle having an o-ring 57 therebetween to give an airtight seal. The rim portions 62a and 62b can be placed in a suitable mold for forming the preshaped reinforcing member and have the reinforcing material adhered to the rim portions in the area 56 with the preshaped reinforcing member 58 extending from the rim portions to give a preshaped reinforcing member permanently fixed to the rim portions. An adhesive material for rim portions which can be metal or fiberglass reinforced polyester can be used advantageously to aid in bonding the rim portions and reinforcing member. Thus, when the preshaped reinforcing member 58 is encapsulated in elastomer a tire is obtained already mounted on the rim.

Since the rim portions are separate in the curved area 59 they can be pulled apart prior to or during mounting to position the o-ring in position and to permit attachment, for instance, by bolts, to the wheel assembly to give a tire mounted on a wheel.

Also, it should be appreciated a disc, wheel-type or tire-type run-flat device of the well-known design could be added. A wheel-tire assembly of this type has the advantage the tire and rim are a unit, and thus the problem of maintaining bead rim seating is avoided, as well as lateral stability is improved, and the cost of mounting is eliminated.

FIG. 19 shows how tires having an unusual shape or configuration can be made very readily with this invention. For instance, the preshaped reinforcing member 58 is formed in the preferred embodiment adhered to the rim flange ends 63. Then this preshaped reinforcing member 58 with the rim portions 56 can be placed in a mold and encapsulated with elastomer as shown by 64 in FIG. 19 and thus provide a tire of the shape shown where the distance from tread to rim is much less than the tread width. Also, this configuration permits the tire to be in compression as well as tension when fully inflated by the valve not shown.

While certain representative embodiments and details have been shown for the purpose of illustrating the invention, it will be apparent to those skilled in this art that various changes and modifications may be made therein without departing from the spirit or scope of the invention.

What is claimed is:

1. A wheel-tire assembly comprising two wheel members joinable around a seal to form a wheel, said wheel members having a rim portion, said rim portion having a preshaped plastic reinforcing member being encapsulated in an elastomer to form a tire.

2. The wheel-tire assembly of claim 1 wherein the tire is a pneumatic tire having an inflation means.

3. A unitary preshaped plastic member molded in the shape of a tire and having a series of continuous strands extending from bead area to bead area, each of said strands being branched to give a wishbone shape.

4. The preshaped member of claim 3 wherein each strand branches in junction of sidewall and tread.

5. The preshaped member of claim 3 wherein each strand branches to form a wishbone shape is displaced in juncture of sidewall and tread a distance sufficient to give a series of crossed strands to form a trapezoidal pattern.

6. The preshaped member of claim 5 wherein the trapezoidal pattern is a parallelogram.

7. The preshaped member of claim 5 wherein the trapezoidal pattern is rectangular to give a belted tire pattern.

* * * * *